(12) United States Patent
Daffos et al.

(10) Patent No.: US 10,807,704 B2
(45) Date of Patent: Oct. 20, 2020

(54) AIRCRAFT LANDING GEAR FITTED WITH A BRAKED WHEEL

(71) Applicant: SAFRAN LANDING SYSTEMS, Velizy-Villacoublay (FR)

(72) Inventors: Mathieu Daffos, Velizy-Villacoublay (FR); Nicolas Darraillans, Velizy-Villacoublay (FR)

(73) Assignee: SAFRAN LANDING SYSTEMS, Vélizy-Villacoublay (FR)

( * ) Notice: Subject to any disclaimer, the term of this patent is extended or adjusted under 35 U.S.C. 154(b) by 454 days.

(21) Appl. No.: 15/853,362

(22) Filed: Dec. 22, 2017

(65) Prior Publication Data

US 2018/0178904 A1    Jun. 28, 2018

(30) Foreign Application Priority Data

Dec. 23, 2016  (FR) ..................................... 16 63335

(51) Int. Cl.
*B64C 25/44* (2006.01)
*B64C 25/36* (2006.01)
(Continued)

(52) U.S. Cl.
CPC .............. *B64C 25/44* (2013.01); *B64C 25/36* (2013.01); *B64C 25/405* (2013.01); *F16D 55/36* (2013.01)

(58) Field of Classification Search
CPC ....... B64C 25/44; B64C 25/36; B64C 25/405; B64C 25/42; F16D 55/36
See application file for complete search history.

(56) References Cited

U.S. PATENT DOCUMENTS

| 3,977,631 A | 8/1976 | Jenny |
| 2013/0299286 A1* | 11/2013 | Tanty .................... F16D 65/186 188/71.5 |

(Continued)

OTHER PUBLICATIONS

Rapport de Recherche Préliminaire / Opinion Écrite sur la Brevetabilité de l'Invention, mailed May 10, 2017, issued in corresponding French Application No. 1663335, filed Dec. 23, 2016, 6 pages.

*Primary Examiner* — Brian M O'Hara
*Assistant Examiner* — Keith L Dixon
(74) *Attorney, Agent, or Firm* — Christensen O'Connor Johnson Kindness PLLC

(57) ABSTRACT

An aircraft landing gear comprising at least an axle carried in the bottom portion of the landing gear, a wheel provided with a rim mounted on the axle of the landing gear via bearings in order to rotate about an axis of rotation, a brake threaded on the axle and including a torque tube extending around the axle, friction members mounted around the torque tube and extending between the torque tube and the rim of the wheel, and at least one brake actuator designed for selectively exerting a braking force on the friction members, the brake actuator being carried by an actuator carrier to which the torque tube is secured, and a rotary drive for driving the wheel in rotation comprising firstly an actuator for driving the wheel in rotation and secondly a transmission member for selectively transmitting movement in rotation from the rotation actuator to the rim of the wheel and extending between the axle and the torque tube. The actuator carrier is centered directly by the axle and the transmission member is carried by the brake and guided in rotation thereon by bearings.

6 Claims, 1 Drawing Sheet

(51) Int. Cl.
  *B64C 25/40* (2006.01)
  *F16D 55/36* (2006.01)

(56) References Cited

U.S. PATENT DOCUMENTS

2013/0327884 A1  12/2013  Yiu
2013/0341134 A1* 12/2013  Chico .................... F16D 65/28
                                              188/158

\* cited by examiner

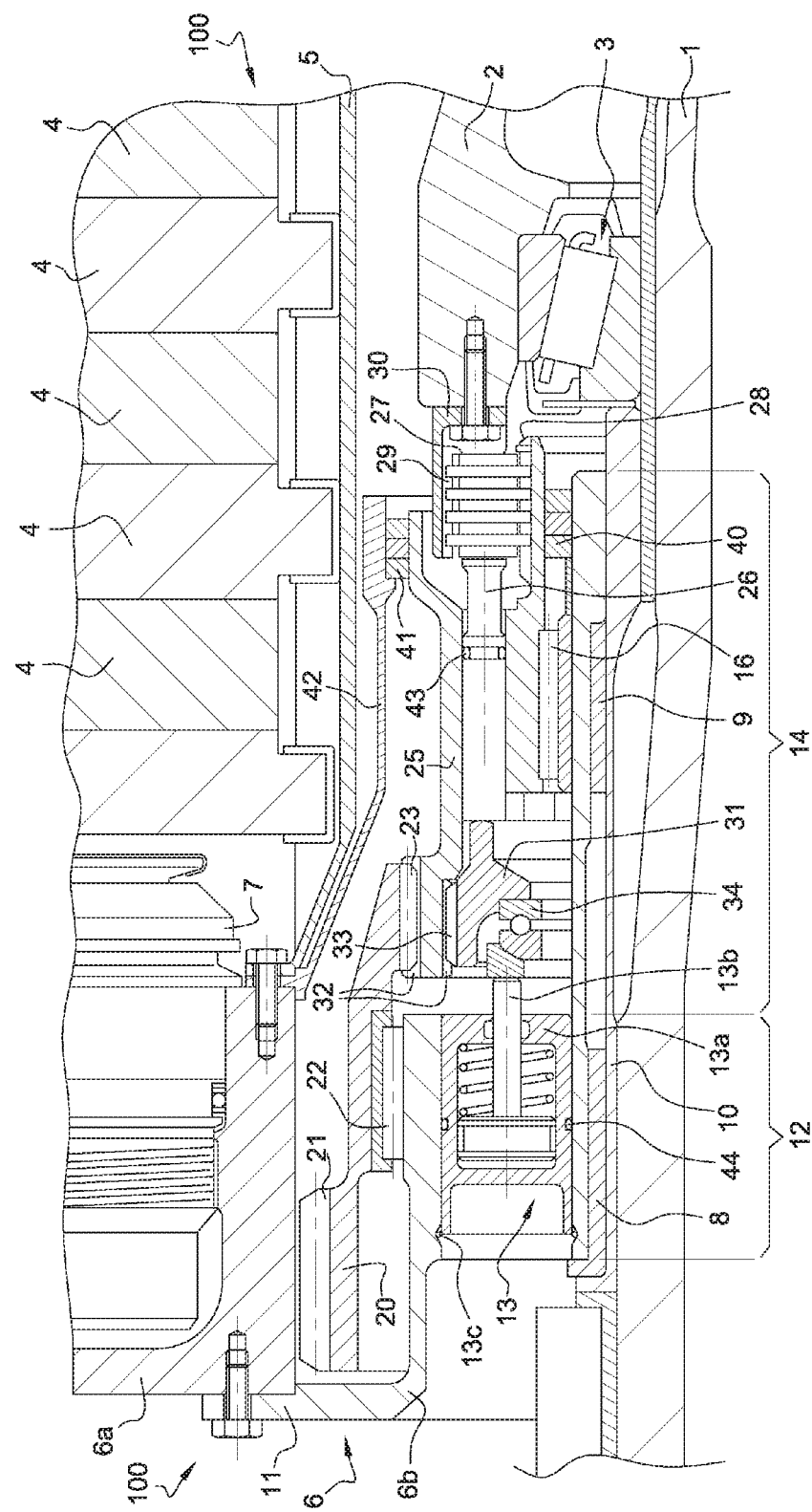

AIRCRAFT LANDING GEAR FITTED WITH A BRAKED WHEEL

TECHNICAL FIELD

Embodiments of the present disclosure relate to landing gear provided with a rotary drive device for driving rotation of a braked wheel carried by the landing gear.

BACKGROUND

Document FR 3 026 717 discloses aircraft landing gear that is provided with braked wheels associated with devices for driving rotation, such that the aircraft may be moved on the ground without having recourse to the thrusters of the aircraft. Each drive device comprises a drive actuator comprising an electric motor coupled in selective manner to the wheel via a coupling (or transmission) member extending between the axle that carries the wheel and the torque tube of the brake on which the brake disks are mounted. In particular, the coupler member comprises a tubular drive shaft that extends around the axle while being guided in rotation over the axle by needle bearings. The tubular drive shaft passes under the base of the actuator carrier that carries the brake actuators, in such a manner that the actuator carrier is not centered directly on the axle but on the drive shaft, via needle bearings.

That arrangement implies that the radial forces caused by braking and transmitted via the actuator carrier to the axle, must transit via the tubular drive shaft and its bearings, which could lead to accelerated fatigue of the elements.

SUMMARY

Embodiments of the present disclosure aim to provide a novel arrangement avoiding radial braking forces transiting via the drive shaft of the transmission member.

In view of achieving this aim, a representative embodiment of the present disclosure provides an aircraft landing gear comprising:
    an axle carried in the bottom portion of the landing gear;
    a wheel provided with a rim mounted on the axle of the landing gear via bearings in order to rotate about an axis of rotation;
    a brake threaded on the axle and including a torque tube extending around the axle, friction members mounted around the torque tube and extending between the torque tube and the rim of the wheel, and at least one brake actuator designed for selectively exerting a braking force on the friction members, the brake actuator being carried by an actuator carrier to which the torque tube is secured; and
    rotary drive means for driving the wheel in rotation comprising firstly an actuator for driving the wheel in rotation and secondly a transmission member for selectively transmitting movement in rotation from the rotation actuator to the rim of the wheel and extending between the axle and the torque tube.

According to embodiments of the present disclosure, the actuator carrier is centered directly by the axle and the transmission member is carried by the brake and guided in rotation thereon by bearings.

Thus, the radial braking forces are transmitted directly to the axle without passing via the transmission member, which member is therefore not subjected to the braking forces.

The term "centered directly" means that the actuator-carrier is threaded on the axle with bronze rings or protective sleeves possibly being interposed thereon, but without any kind of bearing.

The rotary drive actuator may also be carried by the actuator-carrier, or by another portion of the actuator. It is preferably provided with an outlet pinion in order to mesh with a toothed ring gear of a tubular drive shaft of the transmission member.

In some embodiments of the present disclosure, the transmission member comprises a selective link member provided with a cylinder that is guided in rotation on the brake and provided with pushers for selectively pushing disks of a clutch connecting the cylinder to the rim of the wheel.

It is then preferable for the pushers of the cylinder themselves to be pushed via a ball thrust bearing by connection actuators carried by the brake and that extend inside the drive shaft.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

The FIGURE is a section view along a plane containing the axis of rotation of an aircraft wheel in the portion of landing gear that carries the wheel, and fitted with the rotary drive device.

DETAILED DESCRIPTION

The detailed description set forth below in connection with the appended drawing, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The FIGURE shows an axle 1 carried in the bottom portion of aircraft landing gear for rotatably receiving a wheel having a rim, the FIGURE showing the end of the hub 2 and also one of the conical roller bearings 3 that guide the wheel in rotation on the axle 1 about an axis of rotation.

The wheel is fitted with a brake 100 having friction members 4 that can be seen in the FIGURE, which members in this embodiment are carbon disks that are threaded on a torque tube 5 that is connected to an actuator carrier 6 in two portions, namely a ring gear 6a that receives the brake actuators 7 and on which the torque tube 5 is screwed, and a mount 6b that is directly threaded on the axle 1 by being centered on the axle via bronze bushings 8, 9 that are threaded on a protective sleeve 10, which sleeve is threaded on the axle in order to protect the axle.

The mount 6b comprises a plate 11 on which the ring gear 6a is centered and screw-fastened. The plate 11 is connected to a body 12 including cylindrical cavities pierced along axes parallel to the axis of rotation of the wheel in order to receive connection actuators 13, in this embodiment hydraulic actuators each comprising a tubular cylinder 13a from which there extends a rod 13b associated with a piston sliding in sealed manner in the tubular cylinder 13a in order to form a jack. Each of the connection actuators 13 is held axially by a retaining ring 13c. The body 12 is extended by a sleeve 14 that extends until it reaches a conical roller bearing 3 of the wheel.

The landing gear is fitted with a rotary drive device for driving rotation of the wheel via the end of its hub 2, and as in document FR 3 026 717 a coupler member between a drive actuator and the hub extends between the axle 1 and the torque tube 5 of the brake 100.

More precisely, the rotary drive device comprises at least one drive actuator (not shown, and carried for example by the ring gear or by any other portion of the brake or landing gear) comprising an electric motor driving a pinion. The rotary drive device further comprises a coupler member carried by the brake 100, and comprising in this embodiment a tubular drive shaft 20 that extends around the body 12 of the mount 6b. At one of its ends, the tubular drive shaft 20 has a toothed ring gear 21 for being driven in rotation via the pinion of the drive actuator. The tubular drive shaft 20 is guided in rotation by a needle bearing 22 extending in this embodiment between the body 12 of the mount 6b and the tubular drive shaft 20. The tubular drive shaft 20 terminates at its other end in fluting 23 that co-operates with corresponding fluting of a cylinder 25 that is mounted to rotate on the sleeve 14 of the mount 6b, via a needle bearing 16. The fluting 23 is convex in order to allow angular tilting between the tubular drive shaft 20 and the cylinder 25. The cylinder 25 includes a plurality of parallel cavities receiving pushers 26 that bear selectively on disks 27 of a clutch arranged between bars 28 formed on the end of the cylinder 25 and bars 29 formed on the inside surface of a bell 30 applied on the end of the hub 2 in order to come to cover the clutch disks 27 when the wheel is put into place on the axle. The assembly forms the coupler member of the rotary drive device.

When the pushers 26 press the disks 27, the hub 2 is constrained to rotate with the cylinder 25, which is itself driven in rotation by the drive actuator via the tubular drive shaft 20.

The pushers 26 are themselves pushed by an annular piston 31 that is constrained to slide axially in the cylinder 25 by complementary fluting 32, 33 of the annular piston 31 and of the cylinder 25 preventing any rotation of the piston 31 relative to the cylinder 25. The annular piston 31 is itself pushed by the rods 13b of the connection actuators 13 via a ball thrust bearing 34 that is interposed between the rods 13b and the annular piston 31 in order to make it possible to transmit thrust from the rods 13b of the connection actuators 13, which do not rotate, to the annular piston 31, which rotates with the cylinder 25.

Thus, actuation of the connection actuators 13 causes the rods 13b to push on the ball thrust bearing 34, which pushes the annular piston 31, which pushes the pushers 26, which press the disks 27 together in order to constrain the cylinder 25 to rotate with the hub 2 of the wheel. It should be observed that the connection actuators 13 extend inside the tubular drive shaft 20, unlike the arrangement described in document FR 3 026 717.

The space between the ring gear 6a and the mount 6b is sealed by the arrangement of:
  sealing gaskets 40 between the cylinder 25 and the sleeve 14 of the mount 6b;
  sealing gaskets 41 between the cylinder 25 and the end of a casing 42 screw-fastened to the ring gear 6a and extending between the torque tube 5 and the cylinder 25;
  O-rings 43 sealing the sliding of the pushers 26 in the cavities of the cylinder 25; and
  O-rings 44 extending between the body 13a of the actuators and the cavity of the solid portion 12 of the mount 6b that receives it.

These seals prevent outside pollution, in particular carbon dust, from polluting the needle bearings, the fluted sliding connections, or the meshing between the pinion of the drive actuator and the toothed ring gear 21.

It should be observed that the actuator-carrier is mounted directly on the axle (via bronze bushings 8, 9 and the protective sleeve 10), and therefore the radial braking forces transit directly towards the axle without stressing the tubular drive shaft 20, the cylinder 25, or the needle bearings 22, 16.

It should also be observed that the wheel may be removed from the axle without touching the brake 100 or the rotary drive device. In addition, the brake disks 4 can be changed easily once the wheel has been removed, since the coupler member of the rotary drive device extends between the torque tube and the axle and is therefore out of the way.

Although in this embodiment the actuator-carrier is in two portions (ring gear 6a and mount 6b), which makes it possible to extract the ring gear 6a without having to remove the mount or the transmission member when the mount is in place on the axle, the actuator carrier could be made as a single part.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. An aircraft landing gear, comprising:
   an axle carried in the bottom portion of the landing gear;
   a wheel provided with a rim mounted on the axle of the landing gear via first bearings in order to rotate about an axis of rotation;
   a brake threaded on the axle and including a torque tube extending around the axle, friction members mounted around the torque tube and extending between the torque tube and the rim of the wheel, and at least one brake actuator configured for selectively exerting a braking force on the friction members, the brake actuator being carried by an actuator carrier to which the torque tube is secured;
   a rotary drive configured to drive the wheel in rotation comprising firstly a rotation actuator for driving the wheel in rotation and secondly a transmission member for selectively transmitting movement in rotation from the rotation actuator to the rim of the wheel and extending between the axle and the torque tube;
   wherein the actuator carrier is centered directly by the axle and the transmission member is carried by the brake and guided in rotation thereon by second bearings.

2. The landing gear according to claim 1, wherein the transmission member comprises a tubular drive shaft that rotates a cylinder receiving push-rods suitable for pressing selectively on friction disks of a clutch arranged between the cylinder and the rim of the wheel, the tubular drive shaft and the cylinder being carried and guided in rotation by the actuator carrier of the brake.

3. The landing gear according to claim 2, wherein the push-rods of the cylinder are themselves pushed by an annular piston that is constrained to slide axially in the cylinder.

4. The landing gear according to claim 3, wherein the annular piston is itself pushed via a ball thrust bearing by connection actuators arranged in a body of the actuator-carrier around which the tubular drive shaft extends.

5. The landing gear according to claim 3, wherein the drive shaft and the cylinder co-operate in rotation via a convex fluting.

6. The landing gear according to claim 1, wherein the actuator-carrier comprises a mount centered on the axle and carrying the transmission member, and secondly a ring gear fastened in removable manner on the mount and being able to be removed from the mount while said mount is still in place on the axle.

\* \* \* \* \*